US010793011B2

(12) United States Patent
Burow

(10) Patent No.: US 10,793,011 B2
(45) Date of Patent: Oct. 6, 2020

(54) METHOD FOR OPERATING A MOTOR VEHICLE AND CORRESPONDING MOTOR VEHICLE

(71) Applicant: AUDI AG, Ingolstadt (DE)

(72) Inventor: Clemens Burow, München (DE)

(73) Assignee: AUDI AG, Ingolstadt (DE)

( * ) Notice: Subject to any disclaimer, the term of this patent is extended or adjusted under 35 U.S.C. 154(b) by 72 days.

(21) Appl. No.: 15/987,007

(22) Filed: May 23, 2018

(65) Prior Publication Data

US 2019/0160967 A1 May 30, 2019

(30) Foreign Application Priority Data

Nov. 29, 2017 (DE) .......................... 10 2017 221 390

(51) Int. Cl.
*B60L 15/20* (2006.01)
*B60W 30/18* (2012.01)

(52) U.S. Cl.
CPC .... *B60L 15/2081* (2013.01); *B60W 30/18118* (2013.01); *B60L 2240/30* (2013.01); *B60L 2240/421* (2013.01); *B60L 2240/423* (2013.01); *B60L 2260/22* (2013.01)

(58) Field of Classification Search
CPC ........... B60L 15/2081; B60L 2240/423; B60L 2240/421; B60L 2240/30; B60L 2260/22; B60W 30/18118; B60W 2540/00; B60W 10/08; B60W 2510/186; B60W 2540/10; B60W 2520/06; B60W 2520/04; B60W 10/184; B60W 10/182
See application file for complete search history.

(56) References Cited

U.S. PATENT DOCUMENTS

| 2002/0088653 | A1 | 7/2002 | Takamoto et al. |
| 2009/0107740 | A1* | 4/2009 | Bell .................... B60L 15/2009 |
| | | | 180/65.1 |
| 2013/0197733 | A1 | 8/2013 | Zeng et al. |
| 2017/0080946 | A1 | 3/2017 | Fontvieille et al. |

FOREIGN PATENT DOCUMENTS

| DE | 11 2008 001 444 T5 | 4/2010 |
| DE | 10 2008 043 560 A1 | 5/2010 |
| DE | 11 2009 000 043 T5 | 4/2011 |
| DE | 11 2011 101 678 T5 | 7/2013 |
| DE | 10 2013 217 152 A1 | 12/2014 |

(Continued)

OTHER PUBLICATIONS

Circuit Globe, "Closed Loop Control of Drives". Published Nov. 10, 2017. See attached PDF version which includes figures.*

(Continued)

*Primary Examiner* — Michael V Kerrigan
(74) *Attorney, Agent, or Firm* — Maier & Maier, PLLC

(57) ABSTRACT

A method for operating a motor vehicle. The motor vehicle has an electric traction machine. In a first kind of operation of the motor vehicle, before or during a release of a parking brake of the motor vehicle when the motor vehicle is at a standstill, a desired rotational speed for a rotational speed regulation of the traction machine is set to a value corresponding to the standstill of the motor vehicle, and an actual rotational speed of the traction machine is adjusted to the desired rotational speed.

8 Claims, 1 Drawing Sheet

(56) References Cited

FOREIGN PATENT DOCUMENTS

DE   10 2015 214 839 A1   2/2017
WO      2006/133993 A1   12/2006

OTHER PUBLICATIONS

Circuit Globe, "Closed Loop Control of Drives Nov. 10, 2017". Published Nov. 10, 2017. See attached PDF version which established public availability date.*
Search Report dated Dec. 12, 2018 of corresponding European application No. 18171007.0; 10 pages including partial machine-generated English-language translation.
Examination Report dated Mar. 1, 2018 of corresponding German application No. 10 2017 221 390.6; 8 pgs.
European Office Action issued on Apr. 22, 2020, in connection with corresponding EP Application No. 18171007.0 (10 pgs., including machine-generated English translation).

* cited by examiner

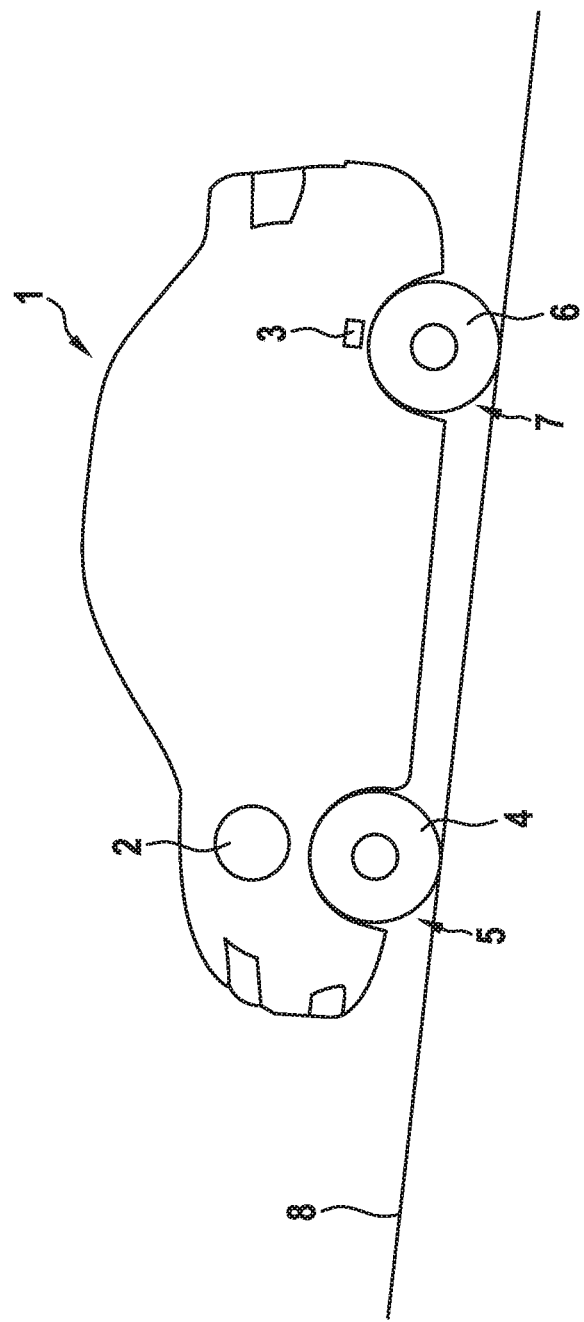

METHOD FOR OPERATING A MOTOR VEHICLE AND CORRESPONDING MOTOR VEHICLE

FIELD

The invention relates to a method for operating a motor vehicle, wherein the motor vehicle has an electric traction machine. The invention further relates to a motor vehicle.

BACKGROUND

Known from the prior art is, for example, the publication DE 10 2015 214 839 A1. Said publication relates to a method for time-discrete regulation of an electronically commuted electric motor, in particular an electric drive motor of a motor vehicle, by use of a time-discrete modulation method, wherein, first of all, at least one regulating parameter is recorded and subsequently at least one control variable is formed, wherein a regulation frequency and a modulation frequency are set separately from each other in order to improve the method.

SUMMARY

The object of the invention is to propose a method for operating a motor vehicle, which, in comparison to known methods, has advantages, and, in particular, makes possible or realizes a smooth startup of the motor vehicle from standstill.

This is achieved in accordance with the invention with a method for operating a motor vehicle. It is hereby provided, that, in a first kind of operation of the motor vehicle before or during a release of a parking brake of the motor vehicle when the motor vehicle is at a standstill, a desired rotational speed for a rotational speed regulation of the traction machine is set to a value corresponding to the standstill of the motor vehicle, and an actual rotational speed of the traction machine is regulated to the desired rotational speed.

The motor vehicle is equipped with the electric traction machine. Said traction machine is provided and designed for driving the motor vehicle and in this regard, for supplying a torque directed at driving the motor vehicle. The motor vehicle is usually equipped with an operating bake as well as a parking brake. The former serves for temporarily slowing down and/or stopping the motor vehicle during a driving operation of the motor vehicle. For operation of the operating bake, it is usually necessary to expend energy for sustaining a braking torque directed at slowing down or stopping the motor vehicle—for example, in the case of a hydraulic operating bake, for sustaining a specific hydraulic pressure.

In contrast, the parking brake is designed in such a way that it can fix the motor vehicle in place without a permanent supply of energy. In this regard, the parking brake can be present in two different operating states. In a first operating state, it releases a movement of the motor vehicle and thus does not directly serve for fixing the motor vehicle in place. In a second operating state, in contrast, it fixes the motor vehicle in place. For this purpose, it acts on at least one wheel of the motor vehicle and preferably on a plurality of wheels of the motor vehicle.

For example, the parking brake acts to hold the motor vehicle in place on a plurality of or on all wheels of a wheel axle, in particular a rear wheel axle, of the motor vehicle. For switching between the first operating state and the second operating state or vice versa, energy must be expended, but not, in contrast, for holding the respective operating state. This means that, by use of the parking brake, the motor vehicle can also be fixed in place over a longer period of time without the expenditure of energy.

If the motor vehicle is standing with an engaged parking brake, that is, in the second operating state of the parking brake, on an upgrade, then the motor vehicle is initially held in place solely by the parking brake against a force that is exerted by the effect of gravity on the motor vehicle due to the upgrade. For startup of the motor vehicle on the upgrade, it can then be provided, initially by means of a drive assembly of the motor vehicle, for example, the traction machine or an internal combustion engine, to build up a torque that is directed at driving the motor vehicle and is opposed to any shift in position of the motor vehicle. Once the drive assembly has built up exactly said torque, the parking brake can be disengaged, without the motor vehicle starting to roll backwards, for example.

If the parking brake is disengaged before the torque has built up, then the motor vehicle rolls backward. If it is disengaged too late, that is, when the torque is greater than the torque required for holding the motor vehicle in place, then this is manifested in a tensioning of the motor vehicle against the engaged parking brake. Therefore, it is necessary in such an approach for the parking brake to be disengaged exactly when the torque required for holding the motor vehicle in place is supplied by means of the drive assembly. Said torque, which may also be referred to as a holding torque, can be determined from the weight of the motor vehicle and the degree of upgrade, for example, an incline of the ground under the vehicle. Said holding torque is set at the drive assembly and the parking brake is ideally released at the moment when the torque supplied by the drive assembly actually corresponds to the holding torque.

Determinations of the holding torque usually cannot be made with great accuracy, however. This means that, in practice, a reliable holding of the motor vehicle in standstill cannot be ensured when the parking brake is released. For this reason, it is then provided that, at least in the first kind of operation of the motor vehicle, even before or at least upon or during release of the parking brake, a rotational speed regulation of the traction machine is carried out, namely, to a rotational speed corresponding to standstill of the motor vehicle.

During the release of the parking brake when the motor vehicle is at a standstill, therefore, the desired rotational speed is set to the rotational speed corresponding to standstill of the motor vehicle and subsequently the rotational speed regulation of the traction machine is carried out, in the course of which the actual rotational speed of the traction machine is regulated to the desired rotational speed. The actual rotational speed is understood here to mean the instantaneous rotational speed of the traction machine.

If the traction machine can be decoupled from the at least one wheel of the motor vehicle, then it is coupled to the wheel, in particular rigidly, before or during the release of the parking brake or when the rotational speed regulation is carried out. In the case of the rigid coupling of the traction machine to the wheel, the rotational speed corresponding to the standstill of the motor vehicle is usually zero. If no rigid coupling is provided and, therefore, slippage is present between the traction machine and the wheel, for example, due to a clutch or the like, then the rotational speed corresponding to the standstill of the motor vehicle can deviate from zero.

It can be provided to carry out the regulation of the actual rotational speed to the desired speed only when the actual speed corresponds to a rotational speed directed against a predetermined direction of travel. If, for example, the motor vehicle is set up for forward travel by way of, for example, a corresponding adjustment of a control element, in particular a selector lever, then the actual rotational speed is regulated to the desired rotational speed only in the case when the actual rotational speed indicates a reverse movement of the motor vehicle. If, in contrast, the motor vehicle is set for backward or reverse travel by once again a corresponding adjustment of the control element, then the actual rotational speed is regulated to the desired rotational speed only in the case when the actual rotational speed indicates a forward movement of the motor vehicle.

In other words, depending on the setting of the motor vehicle or of the control element, a limitation of the actual rotational speed is carried out. Said rotational speed limitation takes place in such a way that, when forward travel is set, the forward movement of the motor vehicle is permitted, while the reverse movement is prevented. Conversely, when reverse travel is set, the reverse movement of the motor vehicle is permitted and the forward movement is prevented.

Obviously, it can alternatively also be provided for the rotational speed regulation to be carried out in such a way that the actual rotational speed is adjusted to a predetermined range, wherein the rotational speed range is limited downward by a minimum rotational speed and/or is limited upward by a maximum rotational speed. The regulation is carried out when the actual rotational speed drops below the minimum rotational speed—if predetermined—and/or when the actual rotational speed exceeds the maximum rotational speed—if predetermined. For example, the minimum rotational speed and/or the maximum rotational speed is/are then set to the rotational speed corresponding to the standstill of the motor vehicle. Preferably, the minimum rotational speed is set to said speed when the reverse movement is to be prevented and the maximum rotational speed is set to said speed when the forward movement is to be prevented. In this respect, the setting of the minimum rotational speed and/or of the maximum rotational speed can be carried out, for example, on the basis of the setting of the motor vehicle or of the control element. If the vehicle is to be held in place fully, that is, in both directions, then the minimum rotational speed and the maximum rotational speed are both set; for example, both of these are set to the speed corresponding to standstill.

A preferred enhancement of the invention provides that, by means of the regulation, a desired torque is determined from a difference between the actual rotational speed and the desired rotational speed and the traction machine is actuated by means of a control for supplying the desired torque. In this regard, the difference between the actual rotational speed and the desired rotational speed constitutes the control variable of the regulation and the desired torque constitutes the controlling variable. The actual rotational speed is preferably measured by means of a rotational speed sensor or is estimated from at least one state variable of the electric machine, for example, a current strength and/or a field strength.

The desired torque describes the torque that is required for holding the motor vehicle at a standstill. For holding the motor vehicle in place, therefore, the traction machine is actuated for supplying the desired torque, namely, with the help of the control. Such a procedure makes it possible to quickly set the torque at the traction machine that is required for holding the motor vehicle in place. This is particularly the case when a regulator carrying out the regulation is a component of a power electronics by means of which the traction machine is actuated. In this regard, the regulation and the control are preferably arranged in a common unit, in particular in a motor control device of the traction machine.

A preferred enhancement of the invention provides that, when a desired torque that opposes the forward movement of the motor vehicle is present, the desired rotational speed is increased in accordance with a startup rotational speed curve over time, and/or, when a desired torque that opposes the reverse movement of the motor vehicle is present, the desired rotational speed is held at the value corresponding to standstill. If the desired torque is opposed to the forward movement of the motor vehicle, then, for an actual torque of the traction machine that is smaller than the desired torque, the motor vehicle would be set into motion forward. Conversely, when a desired torque opposed to the reverse movement is present, the motor vehicle would be set into motion backward.

It can then be provided that the forward movement of the motor vehicle is permitted to an increasing degree over time. If the desired torque that opposes the forward movement is present, then the desired rotational speed can be increased over time, namely, in accordance with the startup rotational speed plot. On file in the startup rotational speed curve is a curve of the desired rotational speed over time. For example, the startup rotational speed curve provides that, starting from the value directed at the standstill of the motor vehicle, the desired rotational speed value increases to a maximum rotational speed, which corresponds to a specific speed of the motor vehicle, for example, a crawl speed.

Additionally or alternatively, the reverse movement of the motor vehicle should be effectively prevented, namely, by holding the desired rotational speed at the value corresponding to standstill when the desired torque opposed to reverse movement is present. With such an procedure, an especially comfortable driving operation of the motor vehicle or an especially comfortable startup of the motor vehicle is realized.

It is especially advantageous when, regardless of the direction of the desired torque, that is, regardless of whether the desired torque opposed to forward movement or reverse movement is present, the desired rotational speed is increased, once again in accordance with the startup rotational speed curve. This means that the motor vehicle starts up going forward in accordance with the startup rotational speed curve, regardless of whether the influence of gravity acting on the motor vehicle is directed toward forward movement or reverse movement.

Another preferred embodiment of the invention provides that, when the desired torque is exceeded by a specified torque given by a driver of the motor vehicle and/or by a driver assistance device, a switch is made to a second kind of operation and the traction machine is actuated for supplying the specified torque. The first kind of operation should be carried out as long as the driver and/or the driver assistance device desire(s) to hold the motor vehicle in place.

As soon as the specified torque that is set or predetermined by the driver or by the driver assistance device is greater than the desired torque, a switch is to be made from the first kind of operation to the second kind of operation, in which the traction machine is actuated for supplying the specified torque. In this way, a quick startup from standstill is ensured, if such a quick startup is required by the driver or by the driver assistance device. Especially preferred, when the parking brake is actuated and, in particular, when the parking brake is pulled or released, a switch is made from the second kind of operation to the first kind of operation. In other words, the described method is carried out when and, in particular, only when, the motor vehicle has been fixed in place beforehand by means of the parking brake. Additionally or alternatively, when the operating brake of the motor vehicle is actuated, a switch can be made to the first kind of operation, particularly even when the parking brake is not actuated.

Another preferred embodiment of the invention provides that a control element of the parking brake is monitored for an actuation and, when an actuation is detected, the desired rotational speed is set to the value corresponding to standstill and the regulation is carried out. The control element may be present, for example, in a first position and in a second position. In the first position, the parking brake is set to hold the motor vehicle in standstill. When the second position is reached, in contrast, the parking brake releases the motor vehicle, that is, the parking brake is released. Preferably, it is provided in this case that the parking brake is released only at the very time when the second position of the control element is reached.

Additionally, it is then provided that the desired rotational speed is set to the value and the regulation is carried out as soon as it is detected that the control element has shifted out of the first position in the direction toward the second position. Based on the shifting of the control element out of the first position, it is already possible to anticipate the release of the parking brake. Accordingly, the necessary precautions for holding the motor vehicle in place by means of the traction machine are met. Such a procedure ensures an especially great comfort. In particular, for carrying out the regulation, a shift is made to the first kind of operation, provided that this has not already occurred.

Especially preferred, it is provided that, as a parking brake, an electric parking brake is used and the parking brake is released as soon as the regulation has been carried out. For example, the control element is therefore connected to the parking brake only indirectly via, for example, an electrical connection, in particular via a control device. For this purpose, the parking brake is designed as an electric parking brake; that is, it is actuated electrically and, in particular, it is actuated by an electric motor. For example, it is then provided that the desired rotational speed is already set to the value and the regulation is carried out as soon as the control element is actuated. However, the parking brake is released only when the regulation is actually active. For example, the control unit is correspondingly set for this purpose.

Another preferred embodiment of the invention provides that, before the desired rotational speed is set to the value corresponding to standstill and/or before the regulation is carried out, a holding torque necessary for stopping the motor vehicle at a fixed location is estimated from at least one state variable, wherein the holding torque is used for feed-forward control of the regulation, and/or an operating brake of the motor vehicle is actuated for supplying a part of the braking torque corresponding to the holding torque and a feed-forward control of the regulation is performed using a difference between the holding torque and the braking torque.

In such a procedure, therefore, it is basically possible to distinguish between two variants, wherein, in the first variant, the operating brake remains disengaged and, in the second variant, the operating brake is used to hold the motor vehicle in place. In both variants, it is initially provided that the holding torque is estimated, namely, from the at least one state variable. The weight of the motor vehicle can hereby serve as a state variable. Additionally, for example, an incline of the upgrade can be taken. The holding torque corresponds to the torque that needs to be supplied overall in order to hold the motor vehicle in a fixed location.

It has already been indicated above that the estimate of the holding torque is afflicted with inaccuracies. However, said holding torque can be taken in order to speed up the determination of the desired torque by means of the regulation. For this purpose, a feed-forward control of the regulation takes place using the holding torque. For example, the holding torque is therefore used as the desired torque at the start of the regulation.

In addition, it can be provided that the operating brake is used in order to hold the vehicle in place. For this purpose, the parking brake is actuated in such a way that it supplies (only) a part of the holding torque, which, therefore, is not sufficient for holding the motor vehicle in place. The missing part of the holding torque for holding the motor vehicle in place is subsequently supplied by means of the traction machine. For this purpose, for example, the feed-forward control of the regulation uses the difference between the holding torque and the braking torque in order to implement the holding of the motor vehicle in place in an especially rapid manner. Based on the feed-forward control of the regulation, the holding of the motor vehicle in place is implemented in an especially reliable and rapid manner.

Another embodiment of the invention provides that, when the specified torque drops below a torque threshold and when an actual rotational speed corresponding to standstill of the motor vehicle is reached, the desired rotational speed is set to the value corresponding to standstill and the regulation is carried out, and, subsequently, the parking brake is actuated for holding the motor vehicle in place, wherein the desired torque determined by means of the regulation is cached. This procedure is used when the motor vehicle comes to a stop, which happens when the specified torque predetermined by the driver or by the driver assistance device leads to a reduction in the speed of the motor vehicle and the speed of the motor vehicle is actually reduced to zero on the basis of this reduction in the given torque.

If the specified torque drops below the torque threshold, then it can be concluded that the motor vehicle is actually intended to come to a stop. If this is the case, then, when standstill is reached, the regulation of the actual rotational speed of the traction machine to the desired rotational speed is carried out. The desired rotational speed is chosen here in such a way that, in turn, it corresponds to a rotational speed at which the motor vehicle is at a standstill. After the motor vehicle reaches standstill, it is then reliably held in standstill, namely, by using the traction machine. For this purpose, the traction machine supplies the desired torque determined by means of the regulation. Said torque is then cached, particularly just when the parking brake for holding the motor vehicle in place is actuated or at least immediately beforehand. By use of the desired torque, it is subsequently possible to realize an extremely comfortable startup of the motor vehicle.

Finally, it is possible in the scope of another embodiment of the invention to provide that, after the parking brake of the motor vehicle has been actuated for holding the motor vehicle in place, the regulation can be discontinued and, before or during the subsequent release of the parking brake, the regulation can be re-engaged and performed under feed-forward control using the cached desired torque. It has already been explained that, before or during the actuation of the parking brake, the desired torque is to be cached. After the actuation of the parking brake, the motor vehicle is reliably held in said standstill by this means. Accordingly, the regulation can be discontinued, in particular in order to save energy.

If the parking brake is then again subsequently released, the regulation is re-engaged in order to hold the motor vehicle in standstill. The feed-forward control is performed here using the cached desired torque. Accordingly, the time until the desired torque required for holding the motor vehicle in place is set is dramatically reduced at the traction machine, so that, in the ideal case, after the release of the parking brake, the motor vehicle is reliably held at standstill, at least initially, by using the traction machine.

The invention further relates to a motor vehicle and, in particular, to carrying out the method in accordance with the statements made in the scope of this description, wherein the motor vehicle has an electric traction machine. In this case, it is provided that, in a first kind of operation of the motor vehicle, before or during a release of a parking brake of the motor vehicle when the motor vehicle is at a standstill, the motor vehicle is designed for the purpose of setting a desired rotational speed for a rotational speed regulation of the traction machine to a value corresponding to standstill of the motor vehicle and to regulate an actual rotational speed of the traction machine to the desired rotational speed.

Reference has already been made to the advantages of such an embodiment of the motor vehicle and to the advantages of such a procedure. Both the motor vehicle and the method for its operation can be developed further in accordance with the statements made in the scope of this description, so that in this regard, reference is made to said statements.

BRIEF DESCRIPTION OF THE FIGURE

The invention will be explained in detail below on the basis of the exemplary embodiments illustrated in the drawing, without a description of the invention thereby ensuing.

FIG. 1 shows a schematic illustration of a motor vehicle.

DETAILED DESCRIPTION

FIG. 1 shows a motor vehicle 1, which is equipped with an electric traction machine 2 and a parking brake 3. The traction machine 2 serves, for example, to drive the wheels 4 of a first wheel axle 5, whereas the parking brake 3 acts on the wheels 6 of a second wheel axle 7. The motor vehicle 1 is standing on an ground surface 8, namely, at or on an upgrade. Accordingly, the ground surface 8 exhibits a certain incline. The motor vehicle 1 is found at a standstill. The parking brake 3 acts here on the wheels 6 of the second wheel axle 7 for holding the motor vehicle 1 at a standstill. The traction machine 2 is initially deactivated.

In order to make possible a comfortable startup of the motor vehicle 1 on the inclined ground surface 8, it is provided that, in a first kind of operation of the motor vehicle 1, before or during a release of the parking brake 3, a desired rotational speed is predetermined for the traction machine 2, said speed corresponding to a rotational speed that is present when the motor vehicle 1 is at a standstill. Subsequently—also still before or during the release of the parking brake 3—a rotational speed regulation of the traction machine 2 is initiated and then carried out. In the scope of the rotational speed regulation, an actual rotational speed of the traction machine 2 is regulated to the desired rotational speed.

After the rotational speed regulation has been initiated or during the initiation thereof, the parking brake 3 is released. Based on the rotational speed regulation to the desired rotational speed corresponding to the standstill of the motor vehicle 1, the traction machine 2 also holds the motor vehicle 1 at a standstill on the inclined ground surface 8. A driver of the motor vehicle 1 can then set said vehicle in motion.

With the described procedure, it is ensured that, when the parking brake 3 is released, no undesired rolling or at most only slight undesired rolling of the motor vehicle 1 occurs. The motor vehicle 1 can therefore not be set in motion inadvertently. This is especially comfortable for the driver of the motor vehicle 1.

The invention claimed is:

1. A method for operating a motor vehicle, comprising:
   the motor vehicle having an electric traction machine, and
      in a first kind of operation of the motor vehicle, before or during a release of a parking brake of the motor vehicle when the motor vehicle is at a standstill, a desired rotational speed of the traction machine is set to a value corresponding to the standstill of the motor vehicle, and an actual rotational speed of the traction machine is controlled to approach the desired rotational speed, wherein, before the desired rotational speed is set to the value corresponding to the standstill and/or before the actual rotational speed of the traction machine is controlled to approach the desired rotational speed, a necessary holding torque is estimated from at least one state variable, wherein the necessary holding torque is used for feed-forward control of the actual rotational speed of the traction machine to approach the desired rotational speed, an operating brake of the motor vehicle is actuated for supplying a braking torque corresponding to a portion of the necessary holding torque, and the feed-forward control of the actual rotational speed of the traction machine to approach the desired rotational speed is performed using a difference between the necessary holding torque and the braking torque.

2. The method according to claim 1, wherein, when the actual rotational speed of the traction machine is controlled to approach the desired rotational speed, a desired torque is determined from a difference between the actual rotational speed and the desired rotational speed, and the traction machine is actuated for supplying the desired torque by a control.

3. The method according to claim 2, wherein, when the desired torque exceeds a specified torque predetermined by a driver of the motor vehicle and/or by a driver assistance device, there is a shift to a second kind of operation and the traction machine is actuated for supplying the specified torque.

4. The method according to claim 1, wherein:
   when a desired torque that is opposed to a forward movement of the motor vehicle is present, the desired rotational speed is increased in accordance with a startup rotational speed curve over time; and/or
   when a desired torque that opposes a reverse movement of the motor vehicle is present, the desired rotational speed is held at the value corresponding to the standstill.

5. The method according to claim 1, wherein a control element of the parking brake is monitored for an actuation and, when an actuation is detected, the desired rotational speed is set to the value corresponding to the standstill and the actual rotational speed of the traction machine is controlled to approach the desired rotational speed.

6. The method according to claim 1, wherein, when a specified torque drops below a torque threshold and when the actual rotational speed reaches a rotational speed corresponding to the standstill of the motor vehicle, the desired rotational speed is set to the value corresponding to the standstill and the actual rotational speed of the traction machine is controlled to approach the desired rotational speed, and subsequently the parking brake is actuated for holding the motor vehicle in place, wherein the desired torque is cached.

7. The method according to claim 1, wherein, after an actuation of the parking brake for holding the motor vehicle in place, control of the actual rotational speed of the traction machine to approach the desired rotational speed is discontinued and, before or during the subsequent release of the parking brake, control of the actual rotational speed of the traction machine to approach the desired rotational speed is resumed and the feed-forward control is performed using a cached desired torque.

8. A motor vehicle in particular for carrying out the method in accordance with claim 1, which has an electric traction machine, wherein the motor vehicle is designed such that, in a first kind of operation of the motor vehicle, before or during a release of a parking brake of the motor vehicle when the motor vehicle is at a standstill, a desired rotational speed of the traction machine is set to a value corresponding to the standstill of the motor vehicle, and an actual rotational speed of the traction machine is controlled to approach the desired rotational speed, wherein, before the desired rotational speed is set to the value corresponding to the standstill and/or before the actual rotational speed of the traction machine is controlled to approach the desired rotational speed, a necessary holding torque is estimated from at least one state variable, wherein the necessary holding torque is used for feed-forward control of the actual rotational speed of the traction machine to approach the desired rotational speed, an operating brake of the motor vehicle is actuated for supplying a braking torque corresponding to a portion of the necessary holding torque, and the feed-forward control of the actual rotational speed of the traction machine to approach the desired rotational speed is performed using a difference between the necessary holding torque and the braking torque.

* * * * *